United States Patent
Viego

(10) Patent No.: US 9,908,235 B2
(45) Date of Patent: Mar. 6, 2018

(54) ROBOTIC SYSTEM

(71) Applicant: Rene Andre Silva Viego, Gurley, AL (US)

(72) Inventor: Rene Andre Silva Viego, Gurley, AL (US)

( * ) Notice: Subject to any disclaimer, the term of this patent is extended or adjusted under 35 U.S.C. 154(b) by 0 days.

(21) Appl. No.: 14/638,682

(22) Filed: Mar. 4, 2015

(65) Prior Publication Data
US 2015/0174761 A1    Jun. 25, 2015

Related U.S. Application Data

(60) Provisional application No. 61/948,709, filed on Mar. 6, 2014.

(51) Int. Cl.
*B25J 9/16* (2006.01)

(52) U.S. Cl.
CPC ... *B25J 9/1623* (2013.01); *G05B 2219/40267* (2013.01); *Y10S 901/09* (2013.01); *Y10S 901/46* (2013.01)

(58) Field of Classification Search
CPC ....... B25J 9/1615; B25J 9/1623; B25J 9/1641
See application file for complete search history.

(56) References Cited

U.S. PATENT DOCUMENTS

| | | | | |
|---|---|---|---|---|
| 2013/0079928 | A1* | 3/2013 | Soe-Knudsen | B25J 9/1656 700/248 |
| 2014/0039517 | A1* | 2/2014 | Bowling | B25J 13/00 606/130 |

OTHER PUBLICATIONS

H. P. Jawale and H. T. Thorat, "Invetigation of Positional Error in Two Degree of Freedom Mechanims With Joint Clearance", J. Mechanisms Robotics, Feb. 3, 2012.*
Linearized control accessed at http://web.mit.edu/2.737/www/MagLev/linearized/ on Sep. 5, 2017.*

* cited by examiner

*Primary Examiner* — Adam R Mott
(74) *Attorney, Agent, or Firm* — Senniger Powers LLP

(57) ABSTRACT

A robotic system that includes a plurality of controlled linkages operating in an environment where random disturbance forces act on the linkages is disclosed. A rigid chassis with first and third linkages pinned to the rigid chassis at one end and pinned at the other end to other linkages is also disclosed. Sensors are also disclosed that sense the respective angles and rates of change of the angles between the chassis and the first and third linkages. Motors are also disclosed that move the first and third linkages about the pinned connections to the chassis. A controller is disclosed that controls the first and second motors as a function of the output of the sensors and a sum of the magnitudes of the discrete disturbance forces acting on the linkages to programmably control the first and second angles. The controller thereby controls the position and motion of all of the linkages without need for calculating the discrete disturbance forces acting on the individual linkages. Electric motors, hydraulic motors, pneumatic motors and similar motors are disclosed. A two part rotary system is also disclosed. The two part rotary system provides stable operation, even in an environment where it is subject to random disturbances. Methods are also disclosed for controlling a robotic system. Other robotic systems and methods are also disclosed.

17 Claims, 4 Drawing Sheets

ROBOTIC SYSTEM

CROSS-REFERENCE TO RELATED APPLICATION

This application claims the benefit of U.S. Provisional Patent Application Ser. No. 61/948,709, filed on Mar. 6, 2014, the entire content of which is incorporated herein by reference.

FIELD OF THE INVENTION

The present invention generally relates to robotic systems. More particularly, the invention relates to robotic systems having a plurality of linkages that are controlled using a substantially linear control system that does not require the separate calculation of disturbance forces acting on each discrete linkage.

BACKGROUND OF THE INVENTION

The underlying principles for robotic systems are well known in the art; however, they are unnecessarily complicated for many applications, especially those that must operate in an environment where the moving linkages of the robotic system are subjected to randomly occurring disturbance forces. The conventional approach for operating such robotic systems in such environments is to model the control system where the disturbance forces acting on each linkage of the robotic system are separately calculated based on input from various sensors. While this technique can lead to good operational results, this technique is unnecessarily complex and requires excessive computer processing resources.

SUMMARY OF THE INVENTION

The present invention provides a robotic system that operates with improved stability in an environment where disturbance forces randomly act on controlled linkages of the system without requiring excessive computer processing resources.

In accordance with one aspect, there is provided a robotic system that includes a plurality of controlled linkages susceptible to being subjected to a plurality of discrete disturbance forces. The robotic system includes a rigid chassis, a first linkage pinned to the rigid chassis, a second linkage pinned to the first linkage, and a third linkage pinned to the rigid chassis and interconnected with the second linkage. The first linkage and the rigid chassis define a first angle, and the third linkage and the rigid chassis define a second angle. A first sensor senses the first angle and a rate of change of the first angle. A second sensor senses the second angle and a rate of change of the second angle. A controller controls the first angle and the second angle as a function of an output of the first sensor, an output of the second sensor, and a sum of the magnitude of the discrete disturbance forces acting on the linkages. Each of the linkages in the robotic system may have a first end and a second end and the robotic system may further include a fourth linkage pinned at the first end to the second end of the third linkage and pinned at the second end to an intermediate point along the second linkage. The first linkage may be pinned at the first end to the rigid chassis and the second linkage may be pinned at the first end to the second end of the first linkage. The third linkage may be pinned at the first end to the rigid chassis. The robotic system may also include a first motor coupled to the first linkage for moving the first linkage about the first end pinned to the chassis, and a second motor coupled to the third linkage for moving the third linkage about the first end pinned to the chassis. The controller may control the first motor and the second motor as a function of an output of the first sensor, an output of the second sensor, and a sum of the magnitude of the discrete disturbance forces acting on the linkages to programmably control the first angle and the second angle. The first and second motors may be selected from a group consisting of electric motors, hydraulic motors and pneumatic motors.

In accordance with another aspect, there is provided a robotic system that includes a plurality of controlled linkages where the linkages each have a first end and a second end. The robotic system includes a rigid chassis, a first linkage pinned at the first end to the rigid chassis, and a second linkage pinned at the first end to the second end of the first linkage. The robotic system also includes a third linkage pinned at the first end to the rigid chassis and a fourth linkage pinned at the first end to the second end of the third linkage. The second end of the fourth linkage is pinned to an intermediate point along the second linkage. A fifth linkage is defined as the portion of the second linkage positioned between the intermediate point and the second end of the second linkage. The first linkage and the rigid chassis define a first angle and the third linkage and the rigid chassis define a second angle. Each of the five linkages is susceptible to being subject to a discrete disturbance force. A first sensor senses the first angle and the rate of change of the first angle. A second sensor senses the second angle and the rate of change of the second angle. A first motor is coupled to the first linkage to move the first linkage about the first end pinned to the chassis and a second motor is coupled to the third linkage to move the third linkage about the first end pinned to the chassis. The robotic system also includes a controller to control the first motor and the second motor as a function of an output of the first sensor, an output of the second sensor, and a sum of the magnitudes of the discrete disturbance forces acting on the linkages to programmably control the first angle and the second angle. The controller thereby controls the position and motion of all of the linkages without need for calculating the discrete disturbance forces acting on the individual linkages. The first and second motors may comprise electric motors, hydraulic motors, pneumatic motors or other similar motors.

In accordance with another aspect, there is provided a method of controlling a robotic system where the robotic system includes a plurality of interconnected linkages susceptible to being subject to a plurality of discrete disturbance forces. The method includes providing a rigid chassis, a first linkage pinned to the rigid chassis, a second linkage pinned to the first linkage, and a third linkage pinned to the rigid chassis and interconnected with the second linkage. The first linkage and the rigid chassis define a first angle and the third linkage and the rigid chassis define a second angle. The method further includes sensing the first angle and a rate of change of the first angle, and sensing the second angle and a rate of change of the second angle. The method further includes controlling the position and velocity of the first and third linkages as a function of the sensed first angle and rate of change of the first angle, the sensed second angle and rate of change of the second angle, and a sum of the magnitude of the discrete disturbance forces acting on the linkages. The method may include coupling a first motor to the first linkage to move the first linkage about the first end pinned to the chassis, and coupling a second motor to the third linkage to move the third linkage about the first end pinned to the chassis. The method may also include controlling the first motor and the second motor as a function of the sensed first angle and rate of change of the first angle, the sensed second angle and rate of change of the second angle, and a sum of the magnitude of the discrete disturbance forces acting on the linkages. The motors may be selecting from a group consisting of electric motors, hydraulic motors and pneumatic motors.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
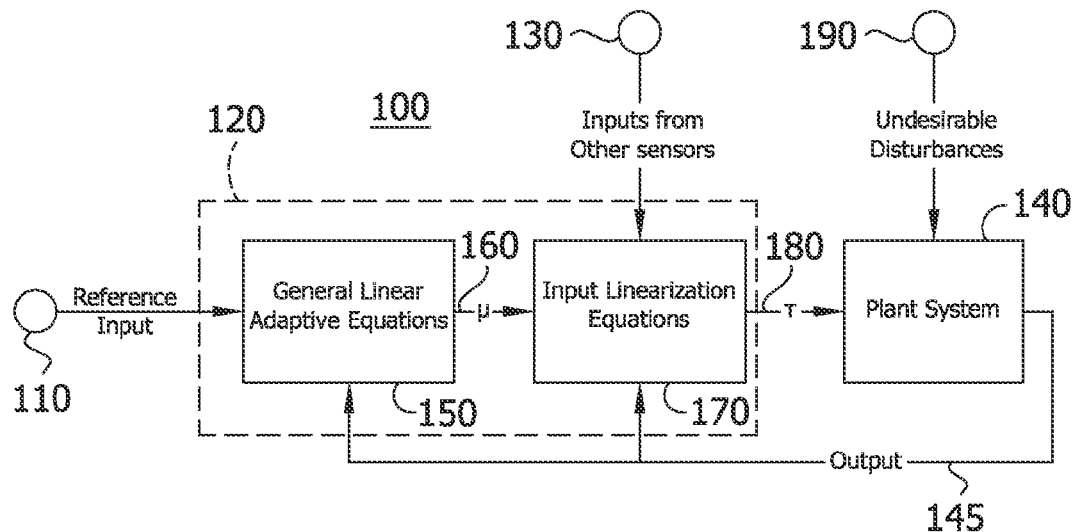
FIG. 1 shows a schematic diagram of various inputs, outputs and disturbances for a robotic system.

FIG. 1 shows a schematic diagram of various inputs, outputs and disturbances occurring during the operation of a robotic system 100. A reference input 110 indicates the various conventional control inputs used to obtain the desired operation from the robotic system 100. The reference input 110 is provided to a controller shown within a dashed line 120. Controller 120 also receives inputs 130 from sensors (not shown) that are attached to a plant system 140 and also receives inputs via an output signal 145 from the plant system 140. Controller 120 processes the reference input 110 and output signal 145 with general linear adaptive equations 150 to provide an output signal 160 and then processes the inputs from sensors 130, output signal 145 and output signal 160 with input linearization equations 170. The output of the controller 120 shown by line 180 is provided to the plant system 140 to control plant system 140 even when plant system 140 is acted upon by random and undesirable disturbance forces 190.

Considering the robotic system 100 more closely, it is seen that a most general control method applying the Euler-Lagrange equation for rigid dynamical systems is disclosed where the sum of the disturbance forces 190 is used to control the robotic system 100 without the need for or complexity of calculating the individual disturbance forces acting on the discrete linkages in the robotic system 100.

More particularly, the forces or torques acting on the i-th link of the robotic system 100 can be defined by the Euler-Lagrange equation [1]:

$$\tau_i = \frac{d}{dt}\left(\frac{d}{d\dot{q}_i}(L(q,\dot{q}))\right) - \frac{d}{dq_i}(L(q,\dot{q})) \quad [1]$$

In equation [1], the following definitions apply:
$L(q,\dot{q}) :=$ the total conservative energy in the system $= K(q,\dot{q}) - P(q,\dot{q})$
$K(q,\dot{q}) :=$ the total kinetic energy in the system
$P(q,\dot{q}) :=$ the total potential energy in the system
$q, \dot{q}, \ddot{q} :=$ list of variables of the system that change overtime Using these definitions, equation [1] simplifies to dynamics equation [2] for the i-th link of the robotic system 100:

$$\tau_i = M_i(q)\ddot{q}_i + H_i(q,\dot{q})\dot{q}_i + C_i(q) \quad [2]$$

The control goal is to produce the following behavior shown by equation [3] from equation [2]:

$$\ddot{q}_i + a_2\dot{q}_i + a_1 q_i = q_{i,sp} \quad [3]$$

To achieve the control behavior shown by equation [3], the following steps are followed. First, equation [2] is rearranged into the following form:

$$\ddot{q}_i = M_i^{-1}(q)\tau_i - M_i^{-1}(q)(H_i(q,\dot{q})\dot{q}_i + C_i(q)) \quad [4]$$

Next, the control method for equation [4] can be represented in the following three equations:

$$\tau_i = M_i(q)u_i \quad [5]$$

$$u_i = u_{c,i} + q_{i,sp} + M_i^{-1}(q)(H_i(q,\dot{q})\dot{q}_i + C_i(q)) \quad [6]$$

$$u_{c,i} = -k_1 q_i - k_2 \dot{q}_i \quad [7]$$

By applying equations [5], [6] and [7], the form of equation [3] results. Using this control approach, however, means that the controller 120 must recalculate the full state of the robotic system 100 at each control step. This requires excessive computer resources because, for example, there needs to be an extra control term for any disturbance. The extra control term must be present or else the controller 120 breaks down because the disturbance will not let the robotic system 100 converge. For example, prior art DAC control methodology uses spline functions and a full-state observer to accurately estimate the disturbances acting on the robotic system 100. It assumes that disturbances are not directly measurable and that there is no a priori knowledge of the disturbance behavior. It is computationally excessive; however, because it does provide an extra control term for each disturbance. None-the-less, the present invention begins with DAC control theory, but then improves upon it by moving to a system that does not require the separate calculation of the disturbance forces on each link of the robotic system 100.

Beginning with equation [4], above, the sum of the disturbance forces is represented by the variable $\tau_{i,d}$ for each i-th linkage. Adding the sum of these torques to equation [4] yields equation [8]:

$$\ddot{q}_i = M_i^{-1}(q)\tau_i + M_i^{-1}(q)(\tau_{i,d} - (H_i(q,\dot{q})\dot{q}_i + C_i(q))) \quad [8]$$

The following two equations [9] and [10] further simplify equation [8] to yield equation [11]:

$$\tau_i = M_i(q)u_i \quad [9]$$

$$\omega_i := M_i^{-1}(q)(\tau_{i,d} - (H_i(q,\dot{q})\dot{q}_i + C_i(q))) \quad [10]$$

$$\ddot{q}_i = u_i + \omega_i \quad [11]$$

It follows that equation [11] is now the linear form of equation [8]. The task is thus to estimate equation [10] completely and accurately regardless of the disturbance torques acting on the individual linkages in the base robotic system 100. Put differently, equation [10] enables a substantially linear control system based on the sum of the disturbance torques without knowledge of the individual disturbance torques acting on the individual linkages.

Execution of such a linear control system begins by transforming equation [11] into a linear state space model:

$$\dot{x} = Ax + Bu + F\omega$$

$$y = Cx \quad [12]$$

By defining $x_1 = q$ and $x_2 = \dot{q}$, equation [12] simplifies to the following expression:

$$\begin{pmatrix} \dot{x}_1 \\ \dot{x}_2 \end{pmatrix} = \begin{bmatrix} 0 & 1 \\ 0 & 0 \end{bmatrix}\begin{pmatrix} x_1 \\ x_2 \end{pmatrix} + \begin{pmatrix} 0 \\ 1 \end{pmatrix}u + \begin{pmatrix} 0 \\ 1 \end{pmatrix}\omega$$

$$\begin{pmatrix} y_1 \\ y_2 \end{pmatrix} = \begin{bmatrix} 1 & 0 \\ 0 & 1 \end{bmatrix}\begin{pmatrix} x_1 \\ x_2 \end{pmatrix}$$

The state model for $\omega$ is next defined as:

$$\omega = hz = (1 \ 0 \ 0)\begin{pmatrix} z_1 \\ z_2 \\ z_3 \end{pmatrix} \quad [13]$$

$$\dot{z} = Dz + \sigma = \begin{bmatrix} 0 & 1 & 0 \\ 0 & 0 & 1 \\ 0 & 0 & 0 \end{bmatrix} + \begin{pmatrix} \sigma_1 \\ \sigma_2 \\ \sigma_3 \end{pmatrix}$$

By substituting equation [13] into equation [12], the following equations [14] are derived:

$$\dot{x} = Ax + Bu + Fhz$$

$$y = Cx \quad [14]$$

The difficulty with equations [14] are that they reflect a non-homogenous system because the state of both the system and the disturbance are found in the equations. This situation is resolved in the analysis to follow.

The goal of all control law is to achieve the control provided by equation [3], above, which only occurs when the following is also true:

$$e(t) = x_{sp} - x \to 0 \quad [15]$$

Taking the first derivative of equation [15] yields:

$$\dot{e} = Ae - A x_{sp} - Bu - Fhz \quad [16]$$

Put differently, the goal of the control method is to make certain that, for any given set point, the error approaches zero. Breaking the control law into its components yields:

$$u = u_p + u_d + u_s = K_p e - \Gamma_s x_{sp} - \Gamma_d \hat{z} \quad [17]$$

Where, in equation [17], the following is also true: $K_p = (k_{p1}, k_{p2})$

Now applying equation [17] to equation [16], the following expressions identified as equations [18] are also found to be true:

$$\dot{e} = (A - BK_p)e - Ax_{sp} - Bu_s - Bu_d - Fhz \quad [18]$$

$$\begin{pmatrix} \dot{e}_1 \\ \dot{e}_2 \end{pmatrix} = $$

$$\left(\begin{bmatrix} 0 & 1 \\ 0 & 0 \end{bmatrix} - \begin{bmatrix} 0 & 0 \\ k_{p1} & k_{p2} \end{bmatrix}\right)\begin{pmatrix} e_1 \\ e_2 \end{pmatrix} - \begin{pmatrix} x_{2sp} \\ 0 \end{pmatrix} - \begin{pmatrix} 0 \\ u_s \end{pmatrix} - \begin{pmatrix} 0 \\ u_d \end{pmatrix} - \begin{pmatrix} 0 \\ z_1 \end{pmatrix}$$

$$\begin{pmatrix} \dot{e}_1 \\ \dot{e}_2 \end{pmatrix} = \begin{pmatrix} e_2 - x_{2sp} \\ -k_{p1}e_1 - k_{p2}e_2 - u_s - u_d - z_1 \end{pmatrix}$$

From equations [18], it is also apparent that:

$$u_s = -k_{p2} x_{2sp}$$

$$u_d = -z_1$$

At this point, the composite full state observer is applicable. The composite system is described as follows:

$$\bar{x} = \begin{pmatrix} e \\ z \end{pmatrix} \Rightarrow \dot{\bar{x}} = \begin{pmatrix} \dot{e} \\ \dot{z} \end{pmatrix} = \begin{bmatrix} A & -Fh \\ 0 & D \end{bmatrix}\begin{pmatrix} e \\ z \end{pmatrix} + \begin{pmatrix} -B \\ 0 \end{pmatrix}(u_d + u_p)\bar{A}\bar{x} + \bar{B}(u_d + u_p)$$

$$y = [-C \ 0]\bar{x} + Cx_{sp} = \bar{C}\bar{x} + Cx_{sp}$$

And then to completely observe the system, the following observer is used:

$$\dot{\hat{\bar{x}}} = \bar{A}\hat{\bar{x}} + \bar{B}(u_d + u_p) - K_o(y - Cx_{sp} - \bar{C}\hat{\bar{x}}) \quad [20]$$

The values of the observer gains must be chosen so that the observer error quickly approaches zero. The execution of equation [20] results in:

$$\begin{pmatrix} \dot{\hat{e}}_1 \\ \dot{\hat{e}}_2 \\ \dot{\hat{z}}_1 \\ \dot{\hat{z}}_2 \\ \dot{\hat{z}}_3 \end{pmatrix} = \begin{pmatrix} \hat{e}_2 \\ -\hat{z}_1 - (u_d + u_p) \\ \hat{z}_2 \\ \hat{z}_3 \\ 0 \end{pmatrix} - K_o\begin{pmatrix} y_1 - x_{1sp} + \hat{e}_1 \\ y_2 - x_{1sp} + \hat{e}_2 \end{pmatrix} \quad [21]$$

Because equation [21] is still expressed in terms of error, the following variable substitutions are applied:

$$\xi_1 = \hat{e}_1 - x_{1sp} \Rightarrow \hat{e}_1 = \xi_1 + x_{1sp}$$

$$\dot{\xi}_1 = \dot{\hat{e}}_1$$

$$\xi_2 = \hat{e}_2 - x_{2sp} \Rightarrow \hat{e}_2 = \xi_2 + x_{2sp}$$

$$\dot{\xi}_2 = \dot{\hat{e}}_2$$

Applying these variable substitutions to equation [21] yields the following equation [22]:

$$\begin{pmatrix} \dot{\xi}_1 \\ \dot{\xi}_2 \\ \dot{\hat{z}}_1 \\ \dot{\hat{z}}_2 \\ \dot{\hat{z}}_3 \end{pmatrix} = \begin{pmatrix} \xi_2 + x_{2sp} \\ -k_{p1}(\xi_1 + x_{1sp}) - k_{p2}(\xi_2 + x_{2sp}) \\ \hat{z}_2 \\ \hat{z}_3 \\ 0 \end{pmatrix} - K_o\begin{pmatrix} y_1 + \xi_1 \\ y_2 + \xi_2 \end{pmatrix} \quad [22]$$

Thus, with the set of equations [22] and the control law, $$u = u_p + u_d + u_s = k_{p1}(\xi_1 + x_{1sp}) + k_{p2}(\xi_2 + x_{2sp}) - \hat{z}_1 - k_{p2}x_{2sp}$$

all of the needed information is available to completely control any robotic system of the form characterized by equation [8], above, so long as there is enough information to generate $M_i(q)$ correctly.

Figure 2:
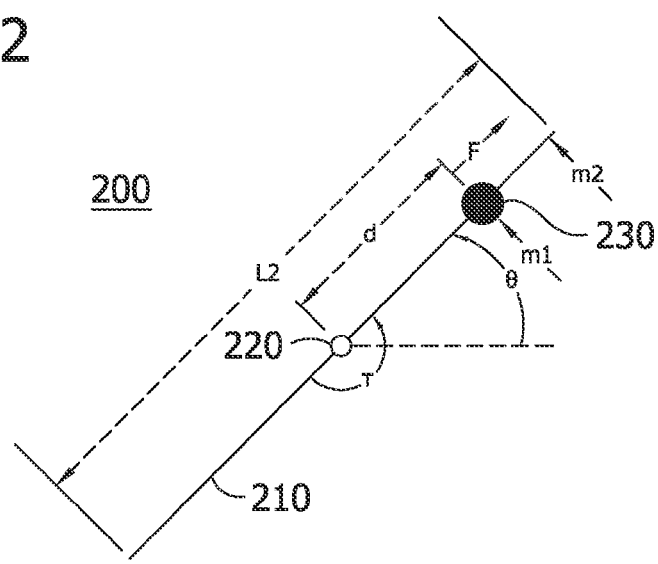
FIG. 2 shows a two part rotary robotic system.

FIG. 2 shows a two part rotary system 200. Rotary system 200 includes an arm 210 having a length L2 attached to a pivot 220. A weight 230 having a mass m1 is located a distance d from the pivot. As the arm 210 rotates through an angle θ, it creates a centrifugal force F.

The rotation of arm 210 about the pivot 220 and the distance d of the weight 230 from the pivot are the two primary control variables. From the above, the following control equations are derived:

$$q_1 = d \text{ and } q_2 = \theta$$

$$x_{11} = q_1 \text{ and } x_{12} = \dot{q}_1 = \dot{x}_{11}$$

$$x_{21} = q_2 \text{ and } x_{22} = \dot{q}_2 = \dot{x}_{21}$$

$$F = \ddot{q}_1 m_1 - 2 m_1 q_1 \dot{q}_2 \Rightarrow \begin{pmatrix} \dot{x}_{11} \\ \dot{x}_{22} \end{pmatrix}$$

$$= \begin{pmatrix} x_{12} \\ m_1^{-1}(2m_1 x_{11} x_{22}) \end{pmatrix} + \begin{pmatrix} 0 \\ m_1^{-1} \end{pmatrix} F$$

$$\tau = \ddot{q}_2 \left( 2 q_1^2 m_1 + \frac{m_2 L_2}{12} \right) \Rightarrow \begin{pmatrix} \dot{x}_{21} \\ \dot{x}_{22} \end{pmatrix}$$

$$= \begin{pmatrix} x_{22} \\ 0 \end{pmatrix} + \begin{pmatrix} 0 \\ (2 x_{11}^2 m_1 + 12^{-1} m_2 L_2)^{-1} \end{pmatrix} \tau$$

Figure 3A:
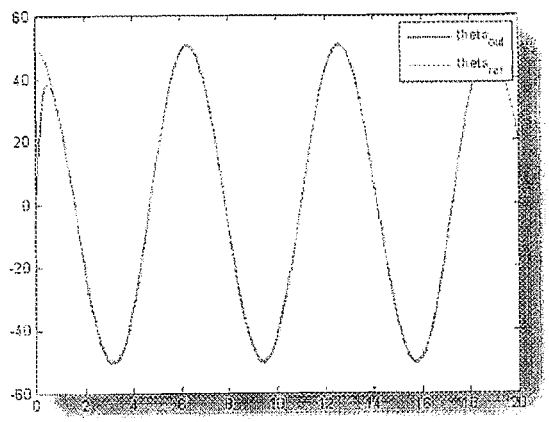
FIGS. 3A to 3C show the estimated stability of a two part rotary robotic system while being subjected to a disturbance force.
Figure 3B:
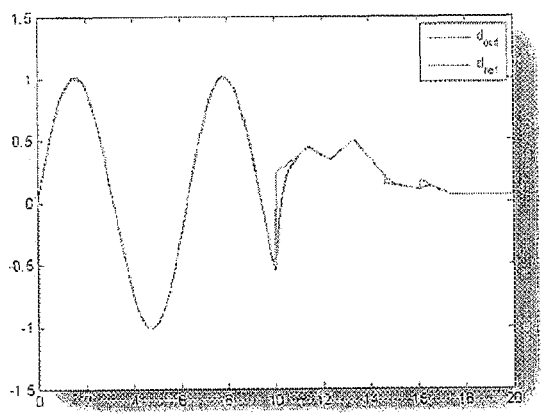
Figure 3C:
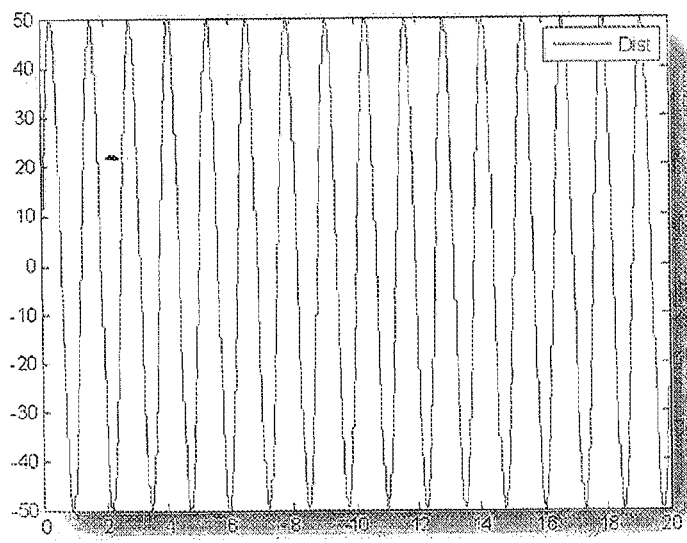

FIG. 3A is a computer simulation showing that the two part rotary system 200 is stable when the above control equations are implemented. FIG. 3C shows a computer simulation of an outside disturbance torque applied to the rotary system 200 and FIG. 3B shows the damping of that disturbance force over time until it approaches zero. This, again, indicates that the control system is stable.

Figure 4:
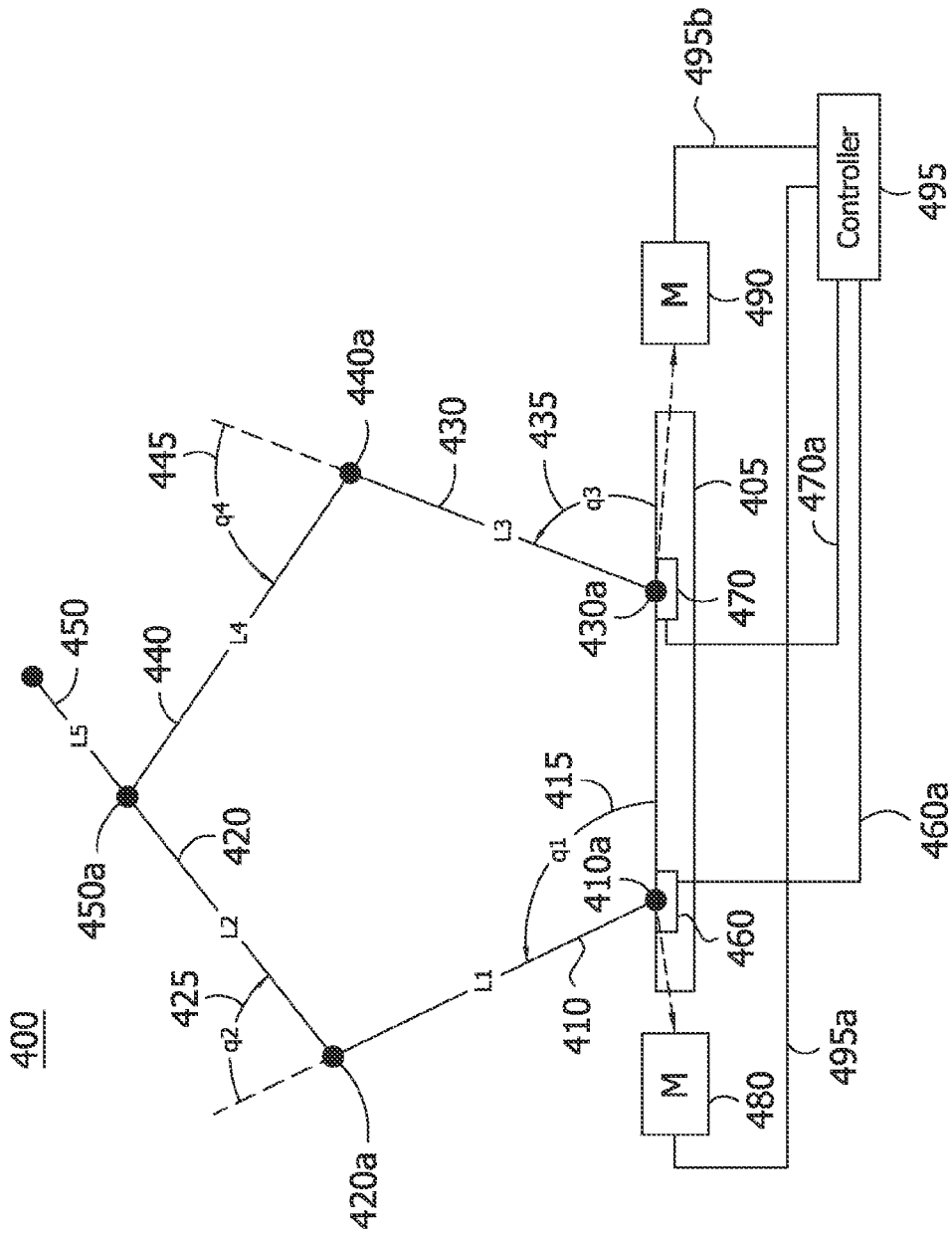
FIG. 4 shows a five link robotic system.

FIG. 4 shows a five link robotic system 400 supported by a rigid chassis 405. Robotic system 400 includes a first linkage 410 pinned at the first end 410a to the rigid chassis 405. A second linkage 420 is pinned at the first end 420a to the second end of the first linkage. A third linkage 430 is pinned at the first end 430a to the rigid chassis 405. A fourth linkage 440 is pinned at the first end to the second end of the third linkage 430. The second end of the fourth linkage is pinned to an intermediate point 450a along the second linkage 420. A fifth linkage 450 is defined as a portion of the second linkage 420 positioned between the intermediate point 450a and the second end of the second linkage 420. The first linkage 410 and the rigid chassis 405 define a first angle 415. The third linkage 430 and the rigid chassis 405 define a second angle 435. Each of the five linkages is susceptible to being subject to a discrete disturbance force. A first sensor 460 senses the first angle 415 and senses a rate of change of the first angle 415. A second sensor 470 senses the second angle 435 and senses a rate of change of the second angle 435. A first motor 480 coupled to the first linkage 410 moves the first linkage 410 about the first end 410a pinned to the chassis 405. A second motor 490 coupled to the third linkage for moving the third linkage about the first end pinned to the chassis. A controller 495 controls the first motor 480 and the second motor 490 as a function of an output of the first sensor 460, an output of the second sensor 470, and a sum of the magnitude of the discrete disturbance forces acting on the linkages to programmably control the first angle 415 and the second angle 435. The controller 495 thus controls motors 480 and 490 via lines 495a and 495b, respectively, to control the position and motion of all of the linkages 410, 420, 430, 440 and 450 without need for calculating the discrete disturbance forces acting on the individual linkages. The first and second motors 480 and 490 can be selected from a group comprising or consisting of electric motors, hydraulic motors, pneumatic motors or any other suitable motor.

Applying the control system above yields the following:

$$M(q) * \ddot{q} + H(q, \dot{q}) * \dot{q} + C(q) = \tau$$

$$M(q) = \begin{bmatrix} a_1 + a_2 * \cos(q_2) & a_3 + a_4 * \cos(q_2) & 0 & 0 \\ a_3 + a_4 * \cos(q_2) & a_3 & 0 & 0 \\ 0 & 0 & a_5 + a_6 * \cos(q_4) & a_7 + a_8 * \cos(q_4) \\ 0 & 0 & a_7 + a_8 * \cos(q_4) & a_7 \end{bmatrix}$$

$$H(q, \dot{q}) = \begin{bmatrix} a_9 * \dot{q}_2 * \sin(q_2) & a_{10} * \dot{q}_2 * \sin(q_2) & 0 & 0 \\ a_{10} * \dot{q}_2 * \sin(q_2) & 0 & 0 & 0 \\ 0 & 0 & a_{11} * \dot{q}_4 * \sin(q_4) & a_{12} * \dot{q}_4 * \sin(q_4) \\ 0 & 0 & a_{12} * \dot{q}_3 * \sin(q_4) & 0 \end{bmatrix}$$

$$\tau = \begin{pmatrix} \tau_1 \\ \tau_2 \\ \tau_3 \\ \tau_4 \end{pmatrix}$$

$$= \begin{pmatrix} \tau_{c1} + \tau_{dist1} \\ \tau_{dist2} \\ \tau_{c2} + \tau_{dist3} \\ \tau_{dist4} \end{pmatrix}$$

$$= \begin{pmatrix} \tau_{c1} - \tau_{f1} + \tau_{f2} + \tau_{ext-dist1} \\ \tau_{f2} - \tau_{f5} + \tau_{ext-dist2} \\ \tau_{c2} - \tau_{f3} - \tau_{f4} + \tau_{ext-dist3} \\ -\tau_{f4} - \tau_{f5} + \tau_{ext-dist4} \end{pmatrix}$$

$$x_1 = q_1; x_2 = \dot{q}_1; x_3 = q_3; x_4 = \dot{q}_2$$

In the above equations, l1=the length of linkage 410, l2=the length of linkage 420 (measured from first end 420a to the midpoint 450a), l3=the length of linkage 430, l4=the length of linkage 440, and l5=the length of linkage 450. Similarly, q1=the angle 415, q2=the angle 425, q3=the angle 435, and q4=the angle 445. The torque disturbances on each of the linkages are shown with the variables $\tau_1$, $\tau_2$, $\tau_3$ and $\tau_4$, respectively, for linkages 410, 420, 430 and 440.

Further applying the control system above yields the following linkage constants:

$$a_1 = \left(\frac{1}{3}\right) *$$
$$(3 * l_{1c}^2 * m_1 + l_2^2 * m_2 + 3 * l_{2c}^2 * m_2(6 * l_2^2 + l_5^2 + 6 * l_2 * l_{5c} + 3 * l_{5c}^2) * m_5 +$$
$$l_1^2 * (m_1 + 3 * (m_2 + m_5)))$$

$$a_2 = \left(\frac{1}{3}\right) * (6 * l_1 * (l_{2c} * m_2 + (l_2 + l_{5c}) * m_5))$$

$$a_3 = \left(\frac{1}{3}\right) * ((l_2^2 - 3 * l_{2c}^2) * m_2 + (l_5^2 - 3 * l_{5c} * (2 * l_2 + l_{5c})) * m_5)$$

-continued $$a_4 = -1 * l_1 * (l_{2c} * m_2 + (l_2 + l_{5c}) * m_5)$$

$$a_5 = \left(\frac{1}{3}\right) * (3 * l_{3c}^2 * m_3 + l_4^2 * m_4 + 3 * l_{4c}^2 * m_4 + l_3^2 * (m_3 + 3 * m_4))$$

$$a_6 = 2 * l_3 * l_{4c} * m_4$$

$$a_7 = \left(\frac{1}{3}\right) * m_4 * (l_4^2 + 3 * l_{4c}^2)$$

$$a_8 = l_3 * l_{4c} * m_4$$

$$a_9 = -2 * l_1 * (l_{2c} * m_2 + (l_2 + l_{5c}) * m_5)$$

$$a_{10} = l_1 * (l_{2c} * m_2 + (l_2 + l_{5c}) * m_5)$$

$$a_{11} = -2 * l_3 * l_{4c} * m_4$$

$$a_{12} = -l_3 * l_{4c} * m_4$$

Figure 5A:
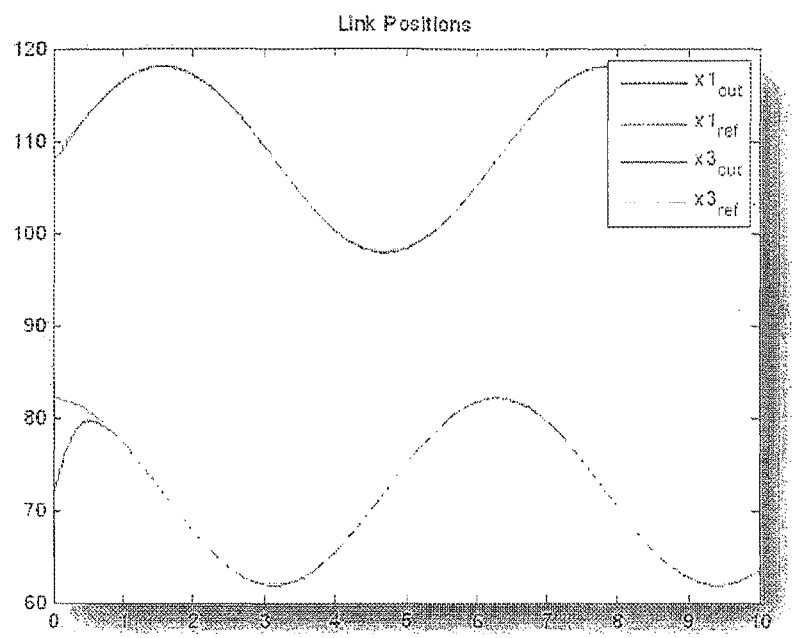
FIGS. 5A to 5B show the estimated stability of a five link robotic system while being subjected to a disturbance force.
Figure 5B:
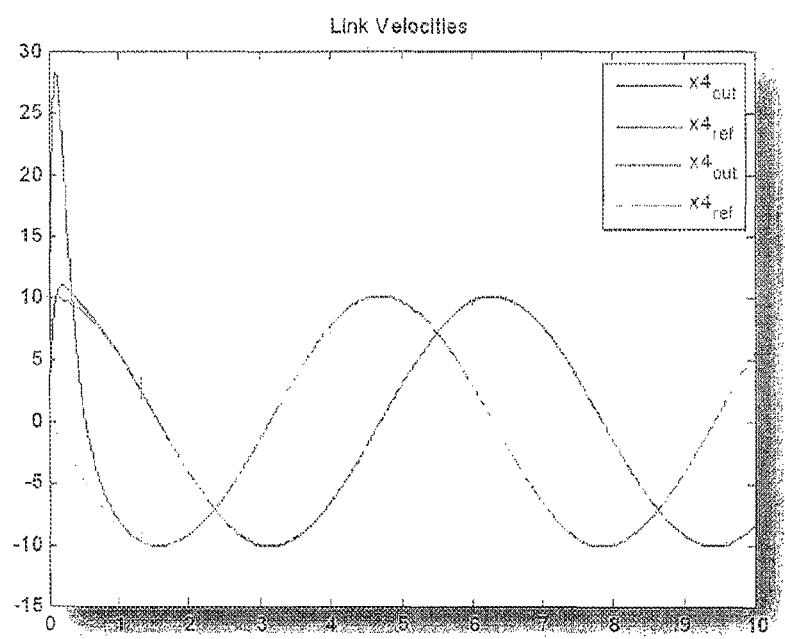

A computer simulation subjecting the five linkage system to torque disturbances shows that the control system is stable. FIG. 5A shows that the linkage positions remain stable and FIG. 5B shows that the linkage velocities are stable, as well.

It follows that robotic systems having two state mechanical components can be implemented with linear adaptive controls using the same set of equations. This allows the various disturbance torques acting on the individual linkages in the robotic system to be treated as a single variable representing the sum of those disturbance torques. This obviates the need to separately calculate the disturbance forces acting on the individual linkages.

Having provided this detailed description, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above systems without departing from the scope of the invention, it is intended that all matter contained in the above description and shown in the accompanying drawings shall be interpreted as illustrative and not in a limiting sense.

What is claimed is:

1. A robotic system including a plurality of controlled linkages susceptible to being subjected to a plurality of discrete disturbance forces, the robotic system comprising:
    a rigid chassis;
    a first linkage pinned to the rigid chassis;
    a second linkage pinned to the first linkage;
    a third linkage pinned to the rigid chassis and interconnected with the second linkage;
    wherein the first linkage and the rigid chassis define a first angle;
    wherein the third linkage and the rigid chassis define a second angle;
    a first sensor for sensing the first angle and for sensing a rate of change of the first angle;
    a second sensor for sensing the second angle and for sensing a rate of change of the second angle; and
    a controller for controlling the first angle and the second angle as a function of an output of the first sensor, an output of the second sensor, and a sum of the magnitude of the discrete disturbance forces acting on the linkages without separately determining the discrete disturbance forces acting on the individual linkages.

2. The robotic system of claim 1 wherein each of the linkages has a first end and a second end, the robotic system further comprising:
    a fourth linkage pinned at the first end to the second end of the third linkage and wherein the second end of the fourth linkage is pinned to an intermediate point along the second linkage; and
    wherein the first linkage is pinned at the first end to the rigid chassis and wherein the second linkage is pinned at the first end to the second end of the first linkage; and
    wherein the third linkage is pinned at the first end to the rigid chassis.

3. The robotic system of claim 2 further comprising a fifth linkage defined as a portion of the second linkage positioned between the intermediate point and the second end of the second linkage.

4. The robotic system of claim 2 further comprising:
    a first motor coupled to the first linkage for moving the first linkage about the first end pinned to the chassis; and
    a second motor coupled to the third linkage for moving the third linkage about the first end pinned to the chassis;
    wherein the controller linearly controls the first motor and the second motor to thereby control the first angle and the second angle as a function of an output of the first sensor, an output of the second sensor, and the sum of the magnitude of the discrete disturbance forces acting on the linkages.

5. The robotic system of claim 4 where the first and second motors are selected from a group consisting of electric motors, hydraulic motors and pneumatic motors.

6. The robotic system of claim 1 wherein each of the linkages has a first end and a second end, the robotic system further comprising:
    a first motor coupled to the first linkage for moving the first linkage about the first end pinned to the chassis; and
    a second motor coupled to the third linkage for moving the third linkage about the first end pinned to the chassis;
    wherein the controller linearly controls the first motor and the second motor to thereby control the first angle and the second angle as a function of an output of the first sensor, an output of the second sensor, and the sum of the magnitude of the discrete disturbance forces acting on the linkages.

7. The robotic system of claim 6 where the first and second motors are selected from a group consisting of electric motors, hydraulic motors and pneumatic motors.

8. A robotic system including a plurality of controlled linkages, the linkages having a first end and a second end, the robotic system comprising:
    a rigid chassis;
    a first linkage pinned at its first end to the rigid chassis;
    a second linkage pinned at its first end to the second end of the first linkage;
    a third linkage pinned at its first end to the rigid chassis;
    a fourth linkage pinned at its first end to the second end of the third linkage;

wherein the second end of the fourth linkage is pinned to an intermediate point along the second linkage;
a fifth linkage defined as a portion of the second linkage positioned between the intermediate point and the second end of the second linkage;
wherein the first linkage and the rigid chassis define a first angle;
wherein the third linkage and the rigid chassis define a second angle;
wherein each of the five linkages is susceptible to being subject to a discrete disturbance force;
a first sensor for sensing the first angle and for sensing a rate of change of the first angle;
a second sensor for sensing the second angle and for sensing a rate of change of the second angle;
a first motor coupled to the first linkage for moving the first linkage about the first end pinned to the chassis;
a second motor coupled to the third linkage for moving the third linkage about the first end pinned to the chassis; and
a controller for controlling the first motor and the second motor as a function of an output of the first sensor, an output of the second sensor, and a sum of the magnitude of the discrete disturbance forces acting on the linkages to control the first angle and the second angle without separately determining the discrete disturbance forces acting on the individual linkages.

9. The robotic system of claim 8 where the first and second motors are selected from a group consisting of electric motors, hydraulic motors and pneumatic motors.

10. A method of controlling a robotic system, the robotic system including a plurality of interconnected linkages susceptible to being subject to a plurality of discrete disturbance forces, the method comprising:
providing a rigid chassis;
providing a first linkage pinned to the rigid chassis;
providing a second linkage pinned to the first linkage;
providing a third linkage pinned to the rigid chassis and interconnected with the second linkage;
wherein the first linkage and the rigid chassis define a first angle; and
wherein the third linkage and the rigid chassis define a second angle;
sensing the first angle and a rate of change of the first angle;
sensing the second angle and a rate of change of the second angle; and
controlling a position and a velocity of the first and third linkages as a function of the sensed first angle and rate of change of the first angle, the sensed second angle and rate of change of the second angle, and a sum of the magnitude of the discrete disturbance forces acting on the linkages without separately determining the discrete disturbance forces acting on the individual linkages.

11. The method of claim 10 wherein each of the linkages has a first end and a second end, the method comprising:
providing a fourth linkage having a first end pinned to the third linkage and having a second end pinned to an intermediate point along the second linkage.

12. The method of claim 11 further comprising:
coupling a first motor to the first linkage for moving the first linkage about a first end of the first linkage pinned to the chassis;
coupling a second motor to the third linkage for moving the third linkage about a first end of the third linkage pinned to the chassis; and
linearly controlling the first motor and the second motor to thereby control the first angle and the second angle as a function of the sensed first angle and rate of change of the first angle, the sensed second angle and rate of change of the second angle, and the sum of the magnitude of the discrete disturbance forces acting on the linkages.

13. The method of claim 12 further comprising the step of selecting the first and second motors from a group consisting of electric motors, hydraulic motors and pneumatic motors.

14. The method of claim 10 further comprising:
coupling a first motor to the first linkage for moving the first linkage about a first end of the first linkage pinned to the chassis;
coupling a second motor to the third linkage for moving the third linkage about a first end of the third linkage pinned to the chassis; and
linearly controlling the first motor and the second motor to thereby control the first angle and the second angle as a function of the sensed first angle and rate of change of the first angle, the sensed second angle and rate of change of the second angle, and the sum of the magnitude of the discrete disturbance forces acting on the linkages.

15. The method of claim 14 further comprising the step of selecting the first and second motors from a group consisting of electric motors, hydraulic motors and pneumatic motors.

16. The method of claim 10 further comprising:
coupling a first motor to the first linkage for moving the first linkage about a first end of the first linkage pinned to the chassis;
coupling a second motor to the third linkage for moving the third linkage about a first end of the third linkage pinned to the chassis; and
controlling the first motor and the second motor to thereby control the first angle and the second angle as a function of the sensed first angle and rate of change of the first angle, the sensed second angle and rate of change of the second angle, and the sum of the magnitude of the discrete disturbance forces acting on the linkages without separately determining the discrete disturbance forces acting on the individual linkages.

17. The method of claim 11 further comprising:
coupling a first motor to the first linkage for moving the first linkage about a first end of the first linkage pinned to the chassis;
coupling a second motor to the third linkage for moving the third linkage about a first end of the third linkage pinned to the chassis; and
controlling the first motor and the second motor to thereby control the first angle and the second angle as a function of the sensed first angle and rate of change of the first angle, the sensed second angle and rate of change of the second angle, and the sum of the magnitude of the discrete disturbance forces acting on the linkages without separately determining the discrete disturbance forces acting on the individual linkages.

* * * * *